June 17, 1930.  W. I. RAYMOND  1,764,225
MOLE AND GOPHER TRAP
Filed May 7, 1929
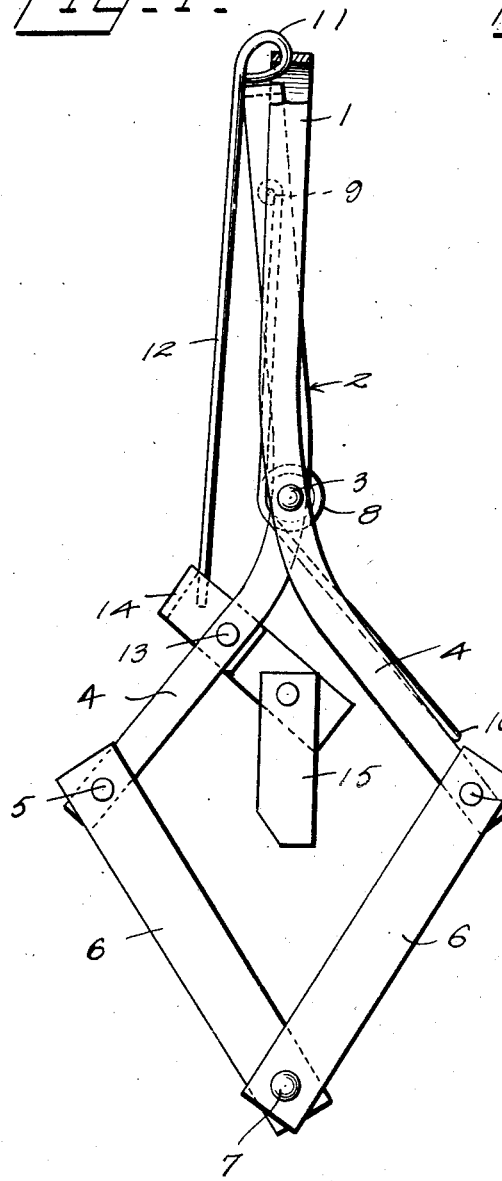
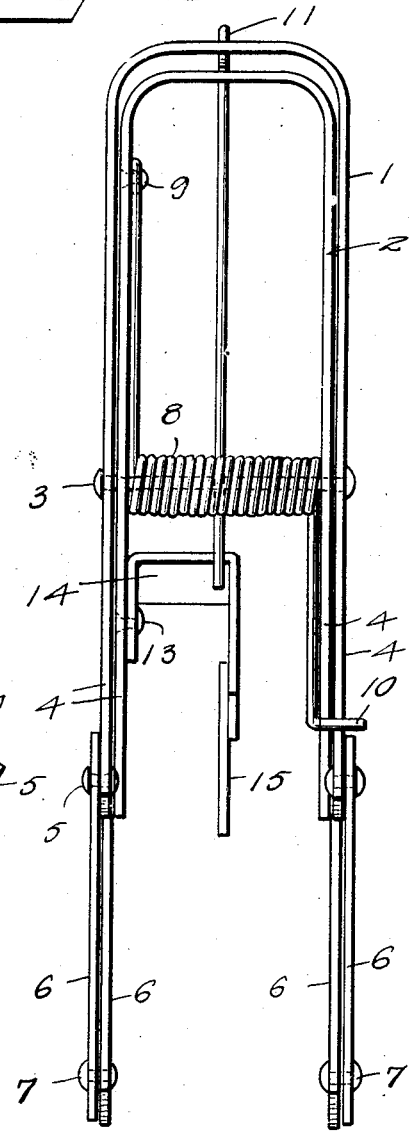
Inventor
W. I. Raymond
By Watson E. Coleman
Attorney Patented June 17, 1930

1,764,225

UNITED STATES PATENT OFFICE

WILLIAM I. RAYMOND, OF PORTLAND, OREGON

MOLE AND GOPHER TRAP

Application filed May 7, 1929. Serial No. 361,049.

This invention relates to the class of fishing and trapping and pertains particularly to improved mole and gopher traps.

The primary object of the present invention is to provide a new and novel type of trap which is designed to be inserted into the animal run-way and to surround the same so that the run-way remains clear except for a trigger element of the trap which depends thereinto and against which the animal's body is pressed as he passes through.

Another object of the invention is to provide a trap which is inserted into the animal run-way and which is of such character that the animal gets well thereinto before the trap is sprung, thus making certain of his capture.

Still another object of the invention is to provide a trap of the above described character which when sprung will indicate this fact by the change in position of certain of the parts remaining above ground.

The invention will be best understood from a consideration of the following detailed description taken in connection with the accompanying drawing forming a part of the present invention with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in side elevation of a trap embodying the present invention, a part being broken away;

Figure 2 is a view in front elevation of the trap structure.

Referring more particularly to the drawing wherein like numerals of reference indicate corresponding parts throughout the several views, the numerals 1 and 2 each indicate one of a pair of inverted substantially U-shaped frames, one of which is of less width than, and positioned within the other, as shown, and when so positioned are connected by a transverse pin or shaft 3 which extends through the leg portions thereof, intermediate the ends of the same.

From the point where the pivot pin 3 extends through the legs of the nested frames 1 and 2, the two legs of each frame are bent to extend out at an obtuse angle to the upper portions thereof, as indicated at 4 so that when the upper portions of the frames are in substantial alinement, the lower portions 4 of the legs of the frames will extend outwardly and downwardly in opposite directions.

To the free end of each portion 4 of each frame is pivotally attached as at 5, one end of a jaw link member 6, the other ends of each adjacent pair of jaw members being pivotally connected together, as at 7, thus forming each side of the trap below the pivot bar 3 in the nature of a lazy tong.

The pivot bar 3 carries between the legs of the frames which it connects, a relatively heavy coiled spring 8, one end of which is secured, as at 9, to one side of the inner frame 2, while the other end is extended to a point adjacent the end of the adjacent leg of the outer frame 1 over which it is turned and upon which it bears as indicated at 10, so that the normal tendency of the spring 8 is to spread or shift apart the upper portions of the frames 1 and 2 so that the pivot points 5 forming the joints between the lower ends of the frame legs and the jaw links 6 will be brought together, or in other words, into closed position.

In order to maintain the trap in set position with the jaws 6 and the frame legs 5 attached thereto in spread apart or open condition, the yoke portion of the frame 1 has loosely connected thereto the looped end 11 of a trigger bar 12 and the other frame has swingingly attached to one leg thereof as at 13, a looped trip member 14 in which the free end of the trigger bar 12 engages, thus holding the jaws in open or set position. This trip member 14 carries a depending tongue 15 which, when the trigger member 12 is engaged therewith to hold the jaws of the trap spread apart, hangs down in a center position between the two pair of link jaws and in a plane substantially the same as the plane in which the joints 5 are located.

From the foregoing description it will be readily seen that with the present trap there is actually provided two sets of jaws arranged in spaced parallel relation and each constituting when open, a substantially diamond or lozenge shaped frame which when the trap is sprung closes up to grip or crush the animal between the sides thereof. The formation of the trap member 14 being substantially U-shaped and having one side thereof pivotally secured to one of the legs 4 of the inner frame member 2 arranges the depending portion 15 which is carried by the free end of the other leg substantially midway between the pair of jaws so that it will be seen that when the set trap is forced down to position in an animal run-way, this depending portion 15 of the trap will be located mid-way between the diamond-shaped jaw frames so that the animal will be well into the trap before he strikes the trip for the release of the trigger 12.

Having thus described my invention, what I claim is:—

1. A trap of the character described, comprising a pair of inverted substantially U-shaped frames arranged one within the other, a pivotal connecting member between the legs of said frames, said frames each having the free ends of the legs thereof bent to extend outwardly, link elements constituting jaws connecting the legs of one frame with those of the other frame at the ends thereof, a spring member carried by said pivotal connection and designed to normally urge the free ends of the legs of the frames together, a trip element pivotally attached to a leg of one frame, and a trigger bar carried by the yoke of the other frame and adapted to engage said trip to maintain the trap set.

2. A trap of the character described, comprising a pair of inverted substantially U-shaped frames arranged one within the other, a pivotal connecting member between the legs of said frames, said frames each having the free ends of the legs thereof bent to extend outwardly, link elements constituting jaws connecting the legs of one frame with those of the other frame at the ends thereof, a spring member carried by said pivotal connection and designed to normally urge the free ends of the legs of the frame together, a trip element carried by a leg of one frame, a trigger bar carried by the yoke of the other frame and adapted to engage said trip to maintain the trap set, said trip being of substantially U-shaped design and having one side attached to the supporting frame and a depending member attached to the other side and located substantially mid-way between the sides of the frames.

In testimony whereof I hereunto affix my signature.

WILLIAM I. RAYMOND.